(12) United States Patent
Vyaznikov

(10) Patent No.: US 6,289,372 B1
(45) Date of Patent: Sep. 11, 2001

(54) METHOD FOR TRANSMITTING AND PROCESSING GROUP MESSAGES IN THE E-MAIL SYSTEM

(75) Inventor: Konstantin Vitalievich Vyaznikov, Russian Federation (RU)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/125,006

(22) PCT Filed: Jul. 2, 1997

(86) PCT No.: PCT/RU97/00025

§ 371 Date: Jul. 30, 1998

§ 102(e) Date: Jul. 30, 1998

(87) PCT Pub. No.: WO98/35489

PCT Pub. Date: Aug. 13, 1998

(51) Int. Cl.$^7$ .................................................. G06F 15/15
(52) U.S. Cl. ........................ 709/206; 709/201; 709/237; 709/245; 707/201
(58) Field of Search ................................... 709/200–202, 709/206–207, 223–224, 236–238, 245; 707/200–204

(56) References Cited

U.S. PATENT DOCUMENTS

| | | | |
|---|---|---|---|
| 5,210,869 | * 5/1993 | Williams | 709/206 |
| 5,644,706 | * 7/1997 | Ruigrok et al. | 709/224 |
| 5,745,692 | * 4/1998 | Lohmann, II et al. | 709/223 |
| 5,890,163 | * 3/1999 | Todd | 707/200 |
| 5,903,724 | * 5/1999 | Takamoto et al. | 709/200 |
| 6,018,766 | * 1/2000 | Samuel et al. | 709/206 |
| 6,076,101 | * 6/2000 | Kamakura et al. | 709/206 |
| 6,212,553 | * 4/2001 | Lee et al. | 709/206 |

* cited by examiner

Primary Examiner—Bharat Barot
(74) Attorney, Agent, or Firm—Ladas & Parry

(57) ABSTRACT

The invention relates to a method of transmitting and processing group messages in an electronic mail system and can be used in the course of processing and forming catalogues of messages meant for many addressees. A technical result is enhancement of the efficiency of processing messages meant for many addressees by optimizing the structure of the messages in order to reduce losses of transmitted information and simplify the processing thereof. An initial message meant for many addressees is converted by forming therefrom a set of subsidiary messages for each addressee which contain an information field, identical for all of the subsidiary messages, and a distinguishing service field which is an identifier of the subsidiary message. At least a two-level catalogue of initial messages is formed in which a line of record on the first level relates to the initial message and contains attributes: list of addresses $Adr\_1, \ldots Adr\_2, \ldots Adr\_N$ of respectively 1st through Nth addressees; a MESS_ID field of a unique identifier of a message; a STATUS field indicating the state of the initial message. Each of the lines of record of a subsequent level relates to a subsidiary message and contains the attributes: address $Adr\_i$ of the ith addressee, MESS_ID_i field of an identifier of a subsidiary message for the ith addressee and a STATUS_i field, indicating the state of the subsidiary message for the ith addressee. During reception of the transmitted subsidiary messages by the addressees, a reception confirmation message is formed in the form of a status message containing among other data an identifier of a delivered subsidiary message and data on its current state. When the status message is received by the sender, a search is carried out in the catalogue of initial messages in respect of the feature of the identifier of a subsidiary message MESS_ID_i and if a corresponding subsidiary message is detected, data on the current state of the sent subsidiary message STATUS_i are derived from the received status message and recorded in the STATUS_i field of the line of record of the subsidiary message of the corresponding level.

15 Claims, 2 Drawing Sheets

| Adr_1, Adr_2...Adr_N | | Mess_Id | | Status | | | | |
|---|---|---|---|---|---|---|---|---|

Fig. 2

| Adr_1 | | Mess_Id_1 | | Status_1 | | | | |
|---|---|---|---|---|---|---|---|---|

| Adr_2 | | Mess_Id_2 | | Status_2 | | | | |
|---|---|---|---|---|---|---|---|---|

| Adr_N | | Mess_Id_N | | Status_N | | | | |
|---|---|---|---|---|---|---|---|---|

Fig. 3

| Adr_1, Adr_2..., Adr_N | Mess_Id | Status | | | |
|---|---|---|---|---|---|
| Adr_1 | Mess_Id_1 | Status_1 | | | |
| Adr_2 | Mess_Id_2 | Status_2 | | | |
| ... | ... | ... | | | |
| Adr_N | Mess_Id_N | Status_N | | | |

Fig. 4

METHOD FOR TRANSMITTING AND PROCESSING GROUP MESSAGES IN THE E-MAIL SYSTEM

FIELD OF THE INVENTION

The invention relates to methods of exchanging messages, more concretely to a method of transmitting and processing group messages in an electronic mail system, and can be used in the creation of systems for processing and forming message catalogues serving for many addressees in systems of the electronic mail type.

BACKGROUND ART

It is known that when messages are transmitted in electronic mail systems, the messages intended for a single addressee and for many addressees are processed in a single flow and are presented to a user during the processing of catalogues of sent messages in the form of a homogeneous row.

It is also known that in the process of sending messages for many addressees, a message in a manner concealed from the user is converted by multiple duplication of the initial message for corresponding addresses in accordance with which a particular message should be sent. The obtained copies of the initial message are sent to concrete addresses. Wherein only the entry corresponding to the initial message for many addressees is maintained in the catalogue of initial messages, while the unique characteristics of the messages obtained by conversion of the initial message are lost (see J. B. Postel. Simple mail transfer protocol. August 1982, Information Sciences Institute, University of Southern California, RFC 821).

A drawback of this method of transmitting and processing group messages is that it is not possible to obtain ready information on the current state of each message which has been sent to one of the addressees among the many indicated in the catalogue of initial messages, for example, that this message has been delivered to a concrete addressee, has been examined by the addressee, etc. The automatic processing of messages according to features relating to messages delivered to concrete addressees, for example, carrying out selection, assortment, etc., is not possible.

The situation is made even worse when there is a large number of addressees which are simultaneously used in one list of addresses, and also in the case of using addresses belonging to different types of mail, for example, such as electronic mail, facsimile communication, for which the transmission of messages is carried out over independent communication channels having very different time characteristics.

The object of the invention is to create a method of transmitting and processing group messages in an electronic mail system, which method overcomes the drawbacks of the aforesaid known methods and ensures enhancement of the efficiency of processing messages intended for many addressees by optimizing the structure of the messages being formed, which makes it possible to substantially reduce losses in the information being sent and to simplify the processing thereof.

This object is achieved in a method of transmitting and processing group messages in an electronic mail system, the method comprising the steps of forming an initial electronic mail message, converting it to ensure transmission to a group of addressees, transmitting the converted initial message to the group of addressees, receiving the transmitted message by addressees of the group of addressees, forming messages confirming reception and transmitting them to a sender, receiving messages confirming the reception and processing them for subsequent use by the sender, in that in accordance with the invention conversion of the initial message is carried out by forming for each initial message a set of subsidiary messages respectively for each addressee of the group of addressees, wherein each of the subsidiary messages of the initial message includes an information field, which is identical for all the subsidiary messages and forms the body of the message, and a distinguishing service field of an identifier of a corresponding subsidiary message, at least a two-level catalogue of initial messages is formed in which the lines of record of the formed subsidiary messages of subsequent levels match up with the line of record of the initial message of the first level, and during reception of the reception confirmation messages, the received messages match up with the lines of record of all levels of the catalogue of initial messages.

Wherein, during the formation of the subsidiary messages, it is preferable that an additional service field be formed in each of them, the service field comprising a feature of the possibility of automatically processing confirmation of delivery, and during reception of the transmitted subsidiary messages by addressees of the group of addressees, the aforesaid service field is derived and a message confirming reception is formed in the form of a status message in which the service field of the identifier of the delivered subsidiary message is introduced, and a service field for identification of this message as confirmation of delivery and a service field comprising data on the current state of the delivered subsidiary message are additionally formed.

Furthermore, during reception of the status message, it is preferable that an identifier of the message be derived from the message, that it be compared with identifiers of subsidiary messages recorded on corresponding levels of the catalogue of initial messages, and if there is detection of coincidence, data on the current state of a sent subsidiary message are derived from the received status message and recorded in the line of record on a corresponding level of the catalogue of initial messages.

It is also preferable that after reception of status messages for all of the sent subsidiary messages, data of the final state of delivery of the initial message are formed from the data derived from service fields of the current state of sent subsidiary messages, and the former data are recorded in the line of record on the first level of the corresponding initial message.

Furthermore, during the forming of the catalogue of initial messages it is preferable that lines of record of subsidiary messages of the second level, ordered according to addresses of those messages contained in the list of addresses of the initial message, be matched up with the line of record of the initial message of the first level.

And it is also preferable during the forming of the catalogue of initial messages that lines of record of a third level, ordered according to types of mail which are selected for transmitting a subsidiary message with a concrete address, be matched up with a line of record of each of the subsidiary messages of the second level which are ordered by addresses.

The term "message" which is mentioned in the application materials is meant to mean a combination of user information (content) and service information (address and other attributes), having material embodiment in the form of an entry by means of storage means (disk units, memory cells), and electrical signals as means for moving the messages in communication lines, network devices.

Wherewith, transmission of a message is meant to mean the physical movement of a message from one subscriber device to another such device, which movement is related, as a rule, to a change in the material representation of the message.

BRIEF DESCRIPTION OF THE DRAWINGS

The invention is explained by an example of its embodiment, illustrated by drawings, in which:

FIG. 2 shows a schematic representation of the structure of an initial message meant for transmission to a number of addressees, before being sent.

FIG. 3 shows a schematic representation of the structure of a set of subsidiary messages meant for transmission to a multiple number of addressees, after being sent.

FIG. 4 shows a schematic representation of a two-level catalogue of initial messages which is formed in the method according to the invention.

DESCRIPTION OF THE PREFERRED EMBODIMENT OF THE INVENTION

Figure 1:
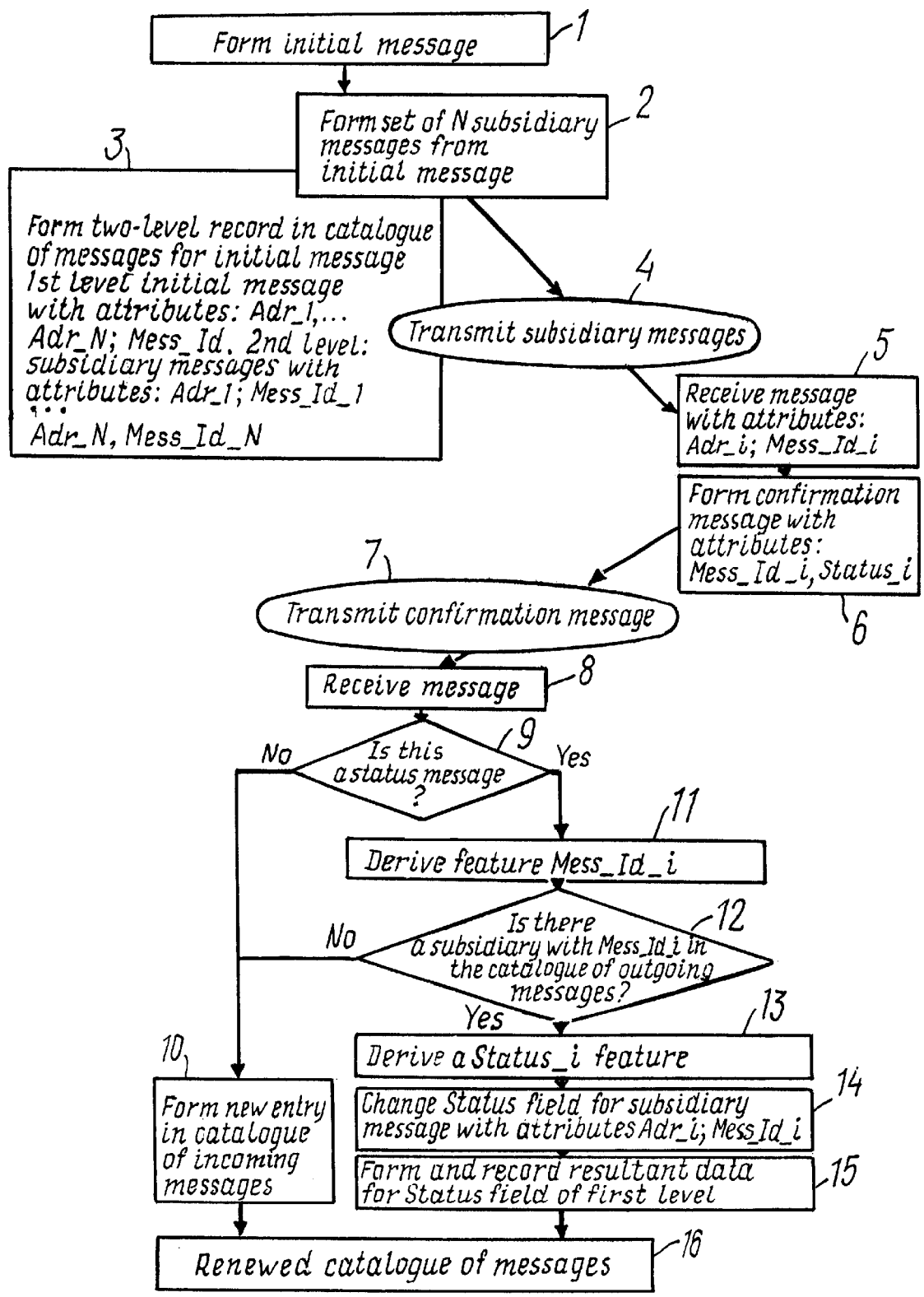
FIG. 1 shows a flowchart of the sequence of operations of a possible embodiment of the method of transmitting and processing group messages in an electronic mail system, in accordance with the invention.

A method of transmitting and processing group messages in an electronic mail system is carried out in the following manner.

As shown in FIG. 1, the sender at first forms an initial message (block 1) which it is desired be sent to a plurality of addressees. The structure of this message is shown in FIG. 2 and includes among others the following fields, which are in principle necessary to carry out the claimed method: an address field comprising a list of addresses Adr__1, Adr__2, . . . Adr__N of respectively the 1st to the Nth addressees; a MESS__ID unique message identifier; a STATUS field indicating the state of the initial message. During step 2 (FIG. 1) a set of subsidiary messages is formed from the initial message for each addressee of the group of N addressees. The structure of the subsidiary messages which are obtained as a result is presented in FIG. 3 and includes an address field for each of the N subsidiary messages, the address field comprising an address Adr__i of the ith addressee (i=1, 2, . . . N), a MESS__ID__i of a unique identifier of the subsidiary message for the ith addressee and a STATUS__i field indicating the state of the subsidiary message for the ith addressee. Simultaneously, at step 3 the sender forms a multilevel (in the example under consideration two-level) catalogue of initial messages, the structure of which catalogue is shown in FIG. 4 and includes an entry on a first level which relates to the initial message (FIG. 2), and a plurality of entries on the second level (FIG. 2) which relate to the subsidiary messages (FIG. 3) obtained by converting the aforesaid initial message. Transmission of N formed subsidiary messages to the addressees is carried out in step 4 (FIG. 1).

During reception of the sent subsidiary messages (block 5), each of the group of addressees at step 6 forms a confirmation message in which the feature of the unique identifier ID__i of the received message is recorded and the feature STATUS__i characterizing the current state of the message delivered to the ith addressee is additionally entered therein.

The formed reception confirmation message comprising information on the current state of the message delivered to the addressee and determined as a "status message" is transmitted in step 7 to the sender of the initial message. The sender, after reception of the message (block 8), checks on whether the received message is a status message (block 9). If the result of the check is negative the obtained message is sent into the general flow of processing received messages and is entered into the catalogue of incoming messages (block 10). If the result of the aforesaid check is positive, in step 11 the sender derives the feature of the unique identifier MESS__ID__i of the delivered message from the received status message. After that in step 12 a search is carried out in the catalogue of initial messages in accordance with the feature of the derived unique identifier of the delivered message, i.e. it is established whether the catalogue of initial messages contains a subsidiary message for the ith addressee. If the result of the check is negative, in step 12 the message is sent into the general flow of processing received messages and is entered into the aforesaid catalogue of incoming messages (block 10). And if a subsidiary message with the required unique identifier is detected in the catalogue of initial messages, the sender in step 13 derives data of the service field STATUS__i of the obtained status message for the delivered subsidiary message for the ith addressee and a corresponding entry on the current state of the delivered subsidiary message is made in the STATUS field for the subsidiary message with attributes ADR__i, MESS__ID__i (block 14).

After the STATUS fields of all the subsidiary messages are filled, the sender, on the basis of an analysis of the data derived from the service fields of the current state of the sent subsidiary messages, in step 15 forms data on the final state of delivery of the initial message and enters them in the line of record for the STATUS field on the first level of the corresponding initial message. Information on the complete success of the transmission, i.e. delivery of all messages to the addressees, on the presence of errors in the transmission, etc., my, for example, relate to such final information. The formed final information may be entered in the form of lines of record into a renewed catalogue of user messages together with formed lines of record for other messages (block 16).

In the aforesaid example of carrying out the invention, consideration is given to a two-level catalogue of initial messages. However, the claimed method may be extended to any required number of levels. For example, for each addressee to which an entry of a subsidiary message of the second level corresponds, entries of subsidiary messages of a third level, ordered, for example, according to the type of mail, etc., may accordingly be provided.

A multilevel catalogue of initial messages, which is formed as a result of realization of the claimed method of transmitting and processing group messages, makes it possible to store and present information to a user on the current state of a message in respect of both each concrete address and the message as a whole. Wherein, the possibility is provided for carrying out different kinds of automatic processing—sorting, selecting, etc., according to features belonging to the subsidiary messages, and also according to final features characterizing the message as a whole with respect to all the addressees.

Thus, as follows from the foregoing, after sending subsidiary messages, unique information on each subsidiary message is maintained as additional attributes of the initial message for a plurality of addressees. And during the processing of messages relating to delivery and other messages of such a type, the unique characteristics of subsidiary messages are used to compare messages on delivery with a concrete entry of a corresponding level in the catalogue of initial messages in order to reflect the current state of a sent subsidiary message.

The claimed method of transmitting and processing group messages in an electronic mail system makes it possible to optimize the structure of transmitted data, the order in which the data are entered, stored and used, which substantially simplifies the processing of catalogues of electronic mail systems, enhances its fast-action and brings loss of data to a minimum.

Industrial Applicability

The invention may be used in electronic mail systems with large volumes of messages sent to a plurality of addressees.

What is claimed is:

1. A method of transmitting and processing group messages in an electronic mail system, the method comprising the steps of forming an initial electronic mail message, converting it to ensure transmission to a group of addressees, transmitting the converted initial message to the group of addressees, receiving the transmitted message by addressees of the group of addressees, forming messages confirming reception and transmitting them to a sender, receiving messages confirming the reception and processing them for subsequent use by the sender, characterized in that conversion of the initial message is carried out by forming for each initial message a set of subsidiary messages respectively for each addressee of the group of addressees, wherein each of the subsidiary messages of the initial message includes an information field, which forms the body of the message and is identical for all the subsidiary messages, and a distinguishing service field of an identifier of a corresponding subsidiary message, at least a two-level catalogue of initial messages is formed in which the lines of record of the formed subsidiary messages of subsequent levels match up with the line of record of the initial message of the first level, and during reception of the reception confirmation messages, the received messages match up with the lines of record of all levels of the catalogue of initial messages.

2. A method according to claim 1, characterized in that during the forming of the subsidiary messages, an additional service field is formed in each of them, the service field comprising a feature of the possibility of automatically processing confirmation of delivery, and during reception of the transmitted subsidiary messages by addressees of the group of addressees, said service field is derived and a message confirming reception is formed in the form of a status message in which a service field of the identifier of the delivered subsidiary message is introduced, and a service field for identification of this message as confirmation of delivery and a service field comprising data on the current state of the delivered subsidiary message are additionally formed.

3. A method according to claim 2, characterized in that during reception of the status message, an identifier of the message is derived from the status message, it is compared with identifiers of subsidiary messages recorded on corresponding levels of the catalogue of initial messages, and if coincidence is detected, data on the current state of a sent subsidiary message are derived from the received status message and recorded in the line of record on a corresponding level of the catalogue of initial messages.

4. A method according to claim 3, characterized in that during the forming of the catalogue of initial messages, lines of record of subsidiary messages of the second level, ordered according to addresses of those messages contained in the list of addresses of the initial message, are matched up with a line of record of the initial message of the first level.

5. A method according to claim 4, characterized in that during the forming of the catalogue of initial messages, lines of record of subsidiary messages of a third level, ordered according to types of mail which are selected for transmitting a subsidiary message with a concrete address, are matched up with a line of record of each of the subsidiary messages of the second level which are ordered by addresses.

6. A method according to claim 3, characterized in that after reception of status messages for all of the sent subsidiary messages, data on the final state of delivery of the initial message are formed from data derived from service fields of the current state of sent subsidiary messages, and the former data are recorded in the line of record on the first level of the corresponding initial message.

7. A method according to any one of claims 6, characterized in that during the forming of the catalogue of initial messages, line of record of subsidiary messages of the second level, ordered according to addresses of those messages contained in the list of addresses of the initial message, are matched up with a line of record of the initial message of the first level.

8. A method according to claim 7, characterized in that during the forming of the catalogue of initial messages, lines of record of subsidiary messages of a third level, ordered according to types of mail which are selected for transmitting a subsidiary message with a concrete address, are matched up with a line of record of each of the subsidiary messages of the second level which are ordered by addresses.

9. A method according to claim 2, characterized in that after reception of status messages for all of the sent subsidiary messages, data on the final state of delivery of the initial message are formed from data derived from service fields of the current state of sent subsidiary messages, and the former data are recorded in the line of record on the first level of the corresponding initial message.

10. A method according to claim 9, characterized in that during the forming of the catalogue of initial messages, lines of record of subsidiary messages of the second level, ordered according to addresses of those messages contained in the list of addresses of the initial message, are matched up with a line of record of the initial message of the first level.

11. A method according to claim 10, characterized in that during the forming of the catalogue of initial messages, lines of record of subsidiary messages of a third level, ordered according to types of mail which are selected for transmitting a subsidiary message with a concrete address, are matched up with a line of record of each of the subsidiary messages of the second level which are ordered by addresses.

12. A method according to claim 2, characterized in that during the forming of the catalogue of initial messages, lines of record of subsidiary messages of the second level, ordered according to addresses of those messages contained in the list of addresses of the initial message, are matched up with a line of record of the initial message of the first level.

13. A method according to claim 12, characterized in that during the forming of the catalogue of initial messages, lines of record of subsidiary messages of a third level, ordered according to types of mail which are selected for transmitting a subsidiary message with a concrete address, are matched up with a line of record of each of the subsidiary messages of the second level which are ordered by addresses.

14. A method according to claim 1, characterized in that during the forming of the catalogue of initial messages, lines of record of subsidiary messages of the second level, ordered according to addresses of those messages contained in the list of addresses of the initial message, are matched up with a line of record of the initial message of the first level.

15. A method according to claim 14, characterized in that during the forming of the catalogue of initial messages, lines of record of subsidiary messages of a third level, ordered according to types of mail which are selected for transmitting a subsidiary message with a concrete address, are matched up with a line of record of each of the subsidiary messages of the second level which are ordered by addresses.

* * * * *

UNITED STATES PATENT AND TRADEMARK OFFICE
CERTIFICATE OF CORRECTION

PATENT NO. : 6,289,372 B1
DATED : September 11, 2001
INVENTOR(S) : Konstantin Vitalievich Vyaznikov It is certified that error appears in the above-identified patent and that said Letters Patent is hereby corrected as shown below:

<u>Title page,</u>
Item [22], "Jul. 2" should read -- Feb. 7 --.

Signed and Sealed this

Second Day of April, 2002

Attest:

Attesting Officer

JAMES E. ROGAN
Director of the United States Patent and Trademark Office